July 23, 1935.   G. G. LANDIS ET AL   2,009,113
SUPPORTING AND CONVEYING MEANS FOR ELECTRIC WELDING APPARATUS
Filed Nov. 20, 1933   2 Sheets-Sheet 2
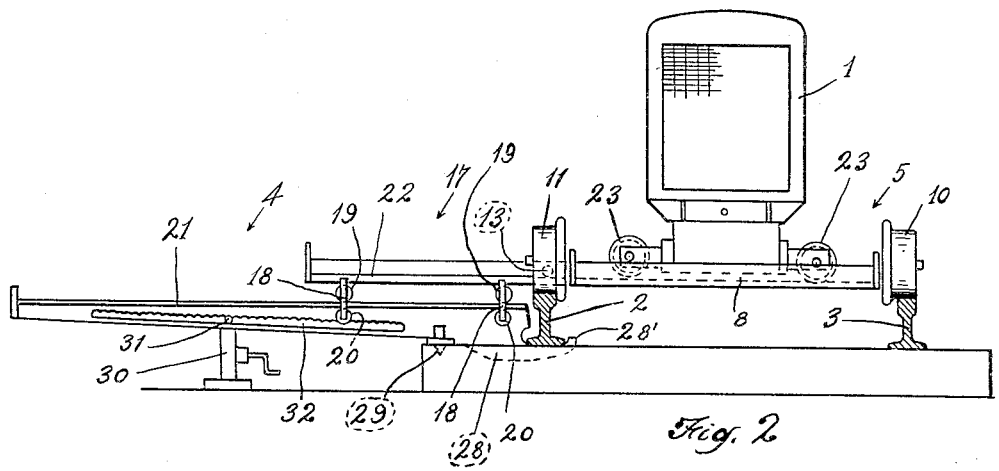
Fig. 2
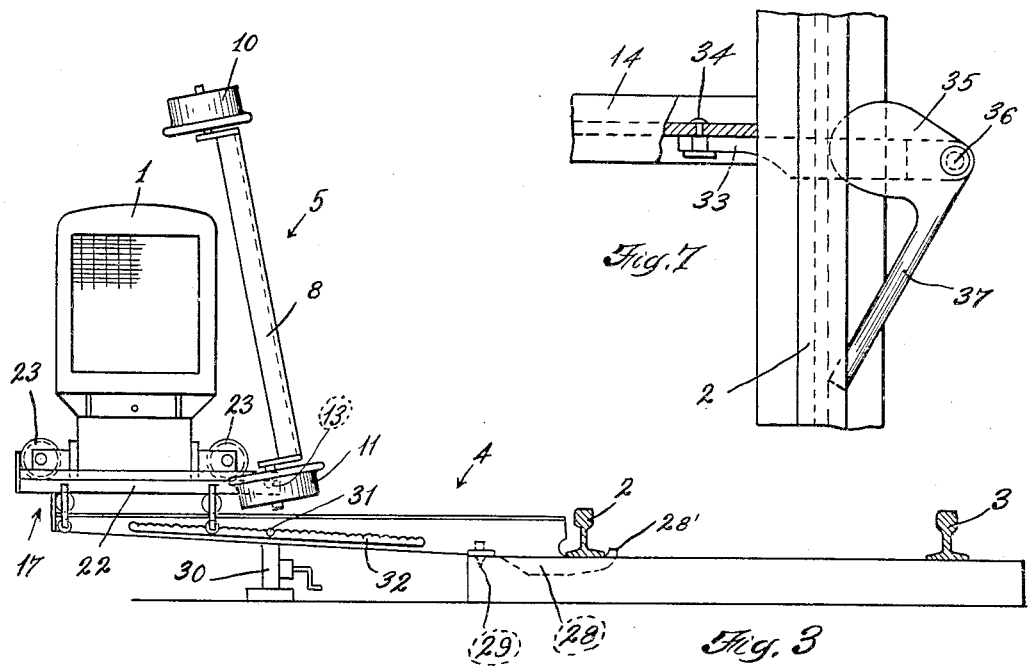
Fig. 3
Fig. 7
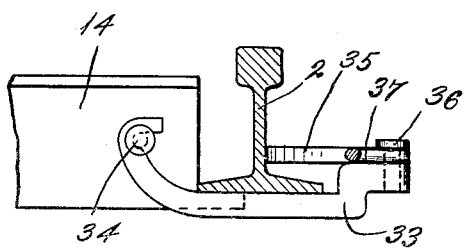
Fig. 6
INVENTORS
George G. Landis and
Frank Malner
BY Fay, Oberlin & Fay
ATTORNEYS Patented July 23, 1935

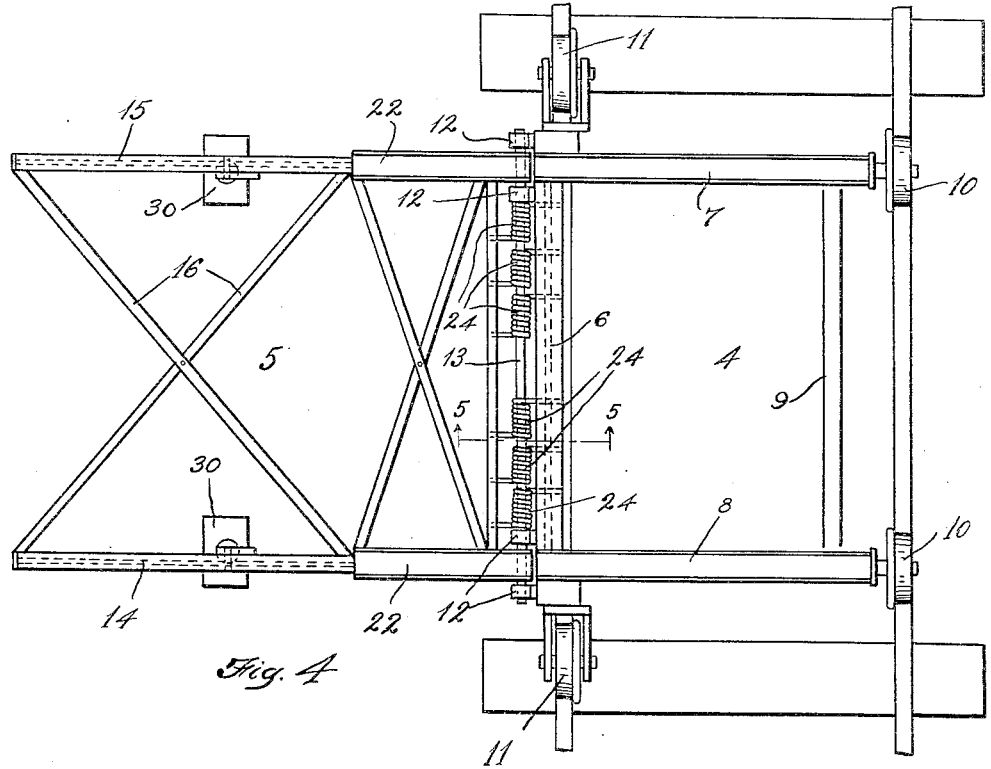
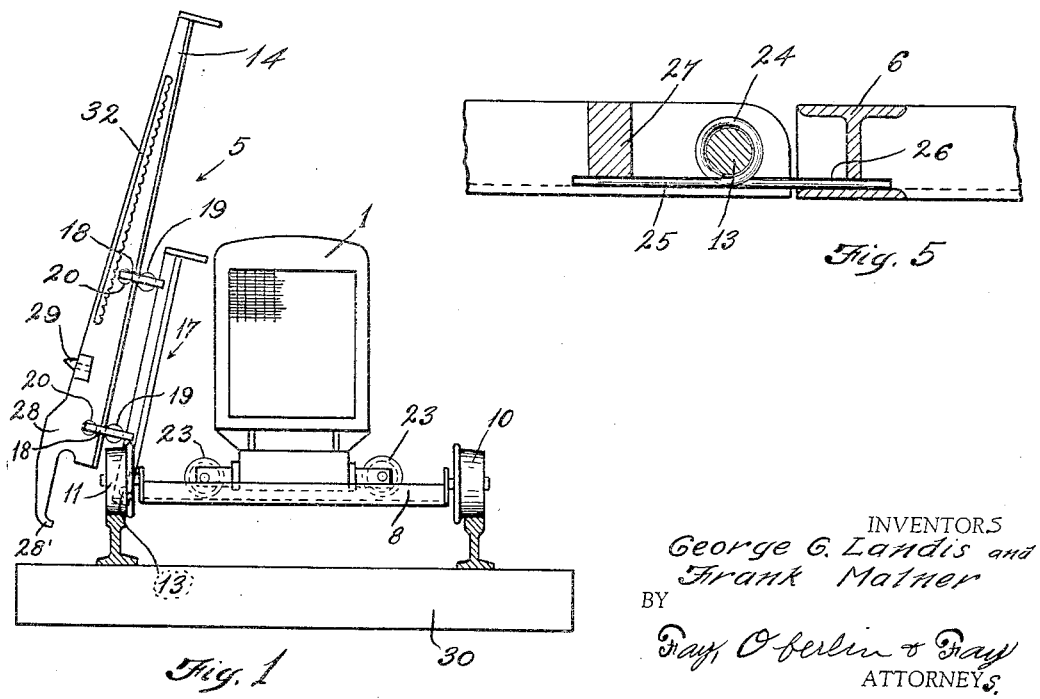

2,009,113

UNITED STATES PATENT OFFICE 2,009,113

SUPPORTING AND CONVEYING MEANS FOR ELECTRIC WELDING APPARATUS

George G. Landis, Cleveland, and Frank Malner, Euclid Village, Ohio, assignors to The Lincoln Electric Company, Cleveland, Ohio, a corporation of Ohio Application November 20, 1933, Serial No. 698,858

18 Claims. (Cl. 105—177)

This invention relates as indicated to supporting and conveying means for electric welding apparatus and pertains more specifically to a carriage for such apparatus by which the same may be conveyed along a railroad right of way and by which the right of way on the rails may be quickly and safely cleared by a removal of the welding apparatus and its associated supporting means therefrom.

It is among the objects of this invention to provide an apparatus of the character described by which very heavy pieces of equipment such as a portable electric arc welding apparatus may be safely conveyed at relatively high speeds along the right of way of a railroad.

It is a further object of our invention to provide a device of the character described by which such heavy equipment as a welding apparatus may be quickly and safely moved laterally off from the rails of a railroad either for the purpose of clearing the right of way or for the purpose of supporting the welding apparatus in a position off from the main rails, should the work required of such apparatus at a particular station consume an appreciable amount of time.

Other objects of our invention will appear as the description proceeds.

To the accomplishment of the foregoing and related ends, said invention, then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used:

In said annexed drawings:—

Fig. 1 is a front elevational view of an apparatus constructed in accordance with the principles of this invention showing the same supporting a portable electric welding apparatus upon the main rails of a railroad; Fig. 2 illustrates such apparatus in position to receive the welding unit preparatory to a removal of the latter laterally off from the main rails; Fig. 3 shows the device according to this invention supporting the welding unit and its associated carriage in a position laterally removed from the main rails so as not to interfere with the signal system or passage of trains along the main right of way; Fig. 4 is a plan view of the supporting device in its extended form with the welding unit removed therefrom; Fig. 5 is a transverse sectional view drawn to an enlarged scale of a portion of Fig. 4, taken on a plane substantially indicated by the line 5—5; Fig. 6 is a fragmentary side elevational view of an alternative form of construction of the means whereby one of the elements or frames of the supporting device may be anchored to one of the main rails; and Fig. 7 is a plan view partially in section of the modification illustrated in Fig. 6.

Referring now more specifically to the drawings and more especially to Figs. 1 to 3, the device, according to the present invention is, as previously described, designed primarily to carry heavy pieces of machinery such as a portable electric arc welding apparatus, generally indicated at 1, along and over the main spaced rails 2 and 3 of a railroad right of way and by which such apparatus as 1 may be quickly and safely moved laterally off from such main rails in order to clear the right of way.

The device, according to this invention, consists generally of two frames respectively generally indicated at 4 and 5. The frame 4 consists of a substantially rectangular construction fabricated from elements 6, 7, 8, and 9 which may be of any convenient structural shape. The frame 4 carries spaced paired wheels 10 and 11 which run upon the rails 2 and 3 and which enable a heavy piece of equipment to be transported at relatively high speeds over such rails.

The frame 4, or more specifically the side element 6 thereof, carries a plurality of brackets 12 which, in turn, support a shaft 13.

The frame 5 includes side rail members 14 and 15 which may be suitably cross-braced by elements such as 16. Movably supported upon the frame 5 is a carriage, generally indicated at 17. The carriage 17 is provided with depending brackets 18 which rotatably support rollers 19 and 20 respectively adapted to engage the upper and lower faces of the flanges 21 formed on the rails 14 and 15 of the frame 5. The carriage 5 or more specifically, the side frame members 22 thereof and the frame 4, or more specifically the side frame members 7 and 8 thereof, are respectively formed to provide parallel, substantially continuous trackways upon which the wheels 23 of the welding apparatus 1 may rest. When the parts are in the position illustrated in Figs. 2 and 4, therefore, the welding apparatus 1 may be easily wheeled laterally off from the frame 4 and onto the carriage 17.

The carriage 17 and consequently, the frame 5 associated therewith, are pivotally connected with the frame 4 by means of the shaft 13 which passes through bearing openings in the side frame members 22 of the carriage 17. Mounted on the shaft 13 are a plurality of coil springs 24, the opposite ends 25 and 26 of which, as most clearly illustrated in Fig. 5, respectively extend under the cross-bar 27 of the carriage 17 and the side frame member 6 of the frame 4. The springs 24 are biased so as to urge the carriage 17 and frame 5 and the frame 4 towards each other rotatably about the axis of the shaft 13, so that when the welder rests on the frame 4, as illustrated in Fig. 1, the frame 5 will be in the position illustrated in such figure and so that when the welder rests on the frame 5, as illustrated in Fig. 3, the frame 4 will occupy the position illustrated in such last-named figure.

The means for supporting the frame 5 and its associated carriage 17 and the welder 1 when positioned thereon laterally of the main rails, will now be described. The frame 5 is, along its inner edge, provided with hook-shaped extensions 28, the form of which is most clearly shown in Fig. 1 and which are adapted to engage the underside of the rail 2 so as to support the frame 5 in the fashion of a cantilever beam. The extensions 28' on the hook projections 28 prevent the latter from slipping out from under the rails 2. The frame 5 also carries sharp pointed legs 29 which are adapted to dig into the cross-ties 30 under the rails and assist in preventing the frame 5 from shifting with respect to the main rails when such frame supports the welder in the fashion illustrated in Fig. 3. The frame 5 is additionally supported by means of screw jacks 30 which are adapted to engage the road-bed along the side of the rails. The heads of the jacks 30 may be provided with transversely extending pins 31 which move in slots 32 formed in the side members or rails 14 and 15 of the frame 5. The upper edge of these slots may be serrated, so that the pins or bearing members 31 of the jacks will be prevented from shifting by sliding when the weight of the welder, as in Fig. 3, is supported primarily by means of such jacks. The provision of the slots 32 permits the jacks to be adjusted longitudinally with respect to the rails 14 and 15 so as to select the most desirable footing for their support and to also enable the same to be positioned in the most advantageous relation with respect to the welder when supported on the carriage.

A modified form of connection between the ends of the rails 14 and 15 and the main rail 2 is illustrated in Figs. 6 and 7. In the modification illustrated in these figures, the rails 14 and 15 of the frame 5 are locked to the main rail 2 by means of a clamp which is removable from the rails 14 and 15 instead of fixedly secured to the frame 5 as are the hook members 28 of the previously described form of construction. The clamps consist of a hook member 33 which, at one end, is adapted to removably engage a pin 34 carried by the rails 14 or 15 and at the other end pivotally supports a cam member 35 by means of a pin 36. The cam member 35 is, as most clearly illustrated in Fig. 7, provided with an extension 37 in the form of a handle by which such cam may be rotated about the axis of the pin 36.

The function and operation of the above described apparatus will now be briefly explained. When the welding unit 1 is being transported along the main rails, i. e., one point to another on the railroad, it will occupy the position on frame 4, as illustrated in Fig. 1. The springs 24 are strong enough to move the frame 5 and its associated carriage 17 into a substantially vertical position but preferably inclined slightly towards the welder so that the frame may be within the confines of the usual clearance provided adjacent the main rails 2. If desired, a stop may be provided against which the springs will urge the frame 5 or a latch or other suitable means might be employed for the purpose of locking the frame 5 in the position illustrated in Fig. 1. Assuming now that it is desired to clear the right of way on the rails 2 and 3, either for the purpose of permitting a train to pass or to clear the signal block of the main rails, or to temporarily position the welder 1 adjacent the main rails at a work station, the frame 5 and its associated carriage 17 will be pulled down, i. e., counterclockwise into the position illustrated in Fig. 2. Movement of the frame 5 about the axis of the shaft 13 will automatically effect an engagement of the hook members 28 with the bottom of the rail 2 and likewise cause the pegs 29 to engage the ties under the main rails. With the frame 5 and associated carriage 17 in the position illustrated in Fig. 2, the jacks 30 will then be moved to a suitable position on the road-bed adjacent the main rails and adjusted so as to support the rails 14 and 15 in a substantially horizontal position. When adjusting the jacks 30, it may be advisable to position the same so that the rails 14 and 15 slope away from the main rails for at least a slight amount so as to facilitate the movement of the welder to the position illustrated in Fig. 3. It is to be understood that the jacks may be extended when it is desired to move the welder back onto the main rails, so that the rails 14 and 15 will incline slightly towards the main rails which would result in the welder rolling back onto the main rails with the application of little external effort.

With the parts as illustrated in Fig. 2, the welder is first rolled over onto the carriage 17. With the welder in such position on the carriage, the frame 4 is then rotated about the axis of the shaft 13 in a counterclockwise direction until it assumes the position illustrated in Fig. 3. The welder and the carriage 17 are then rolled to the left into the position illustrated in Fig. 3 and the carriage then carries with it the frame 4 and its associated wheels, thereby completely clearing the right of way on the main rails 2 and 3.

It will be readily apparent that the employment of the springs 24 considerably facilitates the operation of moving the apparatus either onto or off from the main rails. The springs will be strong enough to approximately counter-balance the weight of the frames 4 and 5, so that the only work which will be required to be expended to move the frames 4 and 5 from one position to another will be only slightly in excess of the frictional resistance of the hinge connecting the frames. The movement of the carriage 17 enables the welder to be moved laterally off from or onto the main rails on a substantially horizontal trackway, so that little effort is required to move this cumbersome piece of apparatus.

When the ballast on the road-bed is tightly packed under the main rails 2 and 3, it may interfere with the rotatable movement of the hook-shaped members 28 in an arcuate position about the axis of the shaft 13 into and out of engagement with the rail 2. When such is the case, the modification illustrated in Figures 6 and 7 may be adopted. When such modification is employed, the above outlined procedure of operation for removing the welder from the main rails is substantially identical with that just described. Before moving the welder over onto the carriage 17 from the position illustrated in Fig. 2, it is necessary, however, to first clamp the ends of the rails 14 and 15 against the rail 2, which is effected by a positioning of the clamp as illustrated in Figs. 6 and 7 so that the rails 14 and 15 will be prevented from pulling away from the main rails when the welder is moved into the position illustrated in Fig. 3.

It should be noted that in the illustration of the apparatus in Fig. 1 a showing of the jacks 30 has not been included. It is to be understood, however, that such jacks may be pivotally secured to the rails 14 and 15 at all times or they may be separate from such rails to be brought into proper position as soon as required in order to support the frame 5 laterally of the main rails.

The apparatus comprising this invention has been described as particularly applicable to support and convey a heavy piece of machinery such as a portable arc welding apparatus. It is to be understood, however, that the supporting device comprising the two hinged frames 4 and 5 and their associated mechanism may be employed for the purpose of supporting and conveying other apparatus such as air compressors and the like.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. A device for conveying portable apparatus or the like from place to place on a railroad, comprising a wheeled carriage upon which such apparatus is supported while being thus transported from place to place, a frame hinged to said carriage, said frame so connected to said carriage and provided with means whereby said frame may be rotated into and supported in a position laterally of the right of way and when so supported providing a means of support in such lateral position for said portable apparatus when moved thereonto and said carriage when rotated about said hinged connection to a position thereover.

2. A supporting device of the character described comprising two relatively movable frames, wheels on one of said frames whereby the same may be supported on spaced rails, means carried by the other of said frames whereby the latter may be supported in a position laterally adjacent said rails and when in such position support said wheeled frame, and spring means associated with said frames whereby such frames are urged toward each other in a manner to reduce the angular relation therebetween.

3. A supporting device of the character described comprising two pivotally connected frames, wheels on one of said frames whereby the same may be supported on spaced rails, means carried by the other of said frames whereby the latter may be supported in a position laterally adjacent said rails and when in such position support said wheeled frame, and a substantially continuous trackway on said frames upon which a wheeled device may be moved from one of such frames to the other.

4. A supporting device of the character described comprising two relatively movable frames, wheels on one of said frames whereby the same may be supported on spaced rails, means carried by the other of said frames whereby the latter may be supported in a position laterally adjacent said rails and when in such position support said wheeled frame, a substantially continuous trackway on said frames upon which a wheeled device may be moved from one of said frames to the other, and spring means associated with said frames whereby such frames are urged toward each other in such a manner as to decrease the angular relation therebetween.

5. A supporting device of the character described comprising two pivotally connected frames, wheels on one of said frames whereby the same may be supported on spaced rails, and means, including a member adapted to engage one of said rails, carried by the other of said frames whereby the latter may be supported in substantially cantilever fashion adjacent said rail.

6. A supporting device of the character described comprising two pivotally connected frames, wheels on one of said frames whereby the same may be supported on spaced rails, and means, including members respectively adapted to engage one of said rails and the ties thereunder, carried by the other of said frames whereby the latter may be supported in substantially cantilever fashion adjacent said rails.

7. A supporting device of the character described comprising two pivotally connected frames, wheels on one of said frames whereby the same may be supported on spaced rails, and means, carried by the other of said frames whereby the latter may be supported adjacent said rails, said means including members respectively adapted to engage one of said rails and the ties thereunder to support such frame in substantially cantilever fashion and a jack carried by said frame and adapted to engage the road bed to afford additional support for such frame.

8. A supporting device of the character described comprising two relatively movable frames, wheels on one of said frames whereby the same may be supported on spaced rails, means including a member adapted to engage one of said rails, carried by the other of said frames whereby the latter may be supported in a position laterally adjacent said rails and when in such position support said wheeled frame, and spring means associated with said frames whereby such frames are urged toward each other in such a manner as to decrease the angular relation therebetween.

9. A supporting device of the character described comprising two relatively movable frames, wheels on one of said frames whereby the same may be supported on spaced rails, means including a member adapted to engage the ties under said rails, carried by the other of said frames whereby the latter may be supported in a position laterally adjacent said rails and when in such position support said wheeled frame, and spring means associated with said frames whereby such frames are urged toward each other in such a manner as to decrease the angular relation therebetween.

10. A supporting device of the character described comprising two relatively movable frames, wheels on one of said frames whereby the same may be supported on spaced rails, means including members respectively adapted to engage one of said rails and the ties thereunder, carried by the other of said frames whereby the latter may be supported in substantially cantilever fashion in a position laterally adjacent said rails and when in such position support said wheeled frame, and spring means associated with said frames whereby such frames are urged toward each other in such a manner as to decrease the angular relation therebetween.

11. A supporting device of the character described comprising two relatively movable frames, wheels on one of said frame whereby the same may be supported on spaced rails, means, including members respectively adapted to engage one of said rails and the ties thereunder and a jack adapted to engage the roadbed, carried by the other of said frames whereby the latter may be supported in a position laterally adjacent said rails and when in such position support said wheeled frame, and spring means associated with said frames whereby such frames are urged toward each other in such manner as to decrease the angular relation therebetween.

12. A supporting device of the character described comprising two relatively movable frames, wheels on one of said frames whereby the same may be supported on spaced rails, means, including a member adapted to engage one of said rails, carried by the other of said frames whereby the latter may be secured and supported in a position laterally adjacent said rails and when in such position support said wheeled frame, a substantially continuous trackway on said frames upon which a wheeled device may be moved from one of said frames to the other, and spring means associated with said frames whereby such frames are urged toward each other in such a manner as to decrease the angular relation therebetween.

13. A supporting device of the character described comprising two relatively movable frames, wheels on one of said frames whereby the same may be supported on spaced rails, means, including a member adapted to engage the ties under said rails, carried by the other of said frames whereby the latter may be supported in a position laterally adjacent said rails and when in such position support said wheeled frame, a substantially continuous trackway on said frames upon which a wheeled device may be moved from one of said frames to the other, and spring means associated with said frames whereby such frames are urged toward each other in such a manner as to decrease the angular relation therebetween.

14. A supporting device of the character described comprising two relatively movable frames, wheels on one of said frames whereby the same may be supported on spaced rails, means, including members respectively adapted to engage one of said rails and the ties thereunder, carried by the other of said frames whereby the latter may be supported in a position laterally adjacent said rails and when in such position support said wheeled frame, a substantially continuous trackway on said frames upon which a wheeled device may be moved from one of said frames to the other, and spring means associated with said frames whereby such frames are urged toward each other in such a manner as to decrease the angular relation therebetween.

15. A supporting device of the character described comprising two relatively movable frames, wheels on one of said frames whereby the same may be supported on spaced rails, means carried by the other of said frames whereby the latter may be supported adjacent said rails, a trackway extending transversely of said wheeled frame, and a carriage having trackways in alignment with the trackways on said wheel frame, movably supported on the other of said frames.

16. A supporting device of the character described comprising two hingedly connected frames, wheels on one of said frames whereby the same may be movably supported on spaced rails, means carried by the other of said frames whereby the latter may be supported in a position laterally adjacent said rails and when in such position support said wheeled frame, a trackway extending transversely of said wheeled frame, and a carriage movably secured to said other frame and provided with a trackway thereon in substantial alignment with the said trackway on said wheeled frame.

17. A supporting device of the character described comprising two hingedly connected frames, wheels on one of said frames whereby the same may be movably supported on spaced rails, means carried by the other of said frames whereby the latter may be supported in a position laterally adjacent said rails and when in such position support said wheeled frame, a trackway extending transversely of said wheeled frame, and a carriage movably secured to said other frame and provided with a trackway thereon in substantial alignment with the said trackway on said wheeled frame, and spring means associated with said frames urging the same toward each other in such manner as to decrease the angular relation therebetween.

18. In a device of the character described, the combination of a wheeled carriage, a material supporting frame hingedly connected to said carriage, and spring means associated with said carriage and frame whereby the same are urged toward each other in such manner as to decrease the angular relation therebetween.

GEORGE G. LANDIS.
FRANK MALNER.